United States Patent
Brewer et al.

(10) Patent No.: US 6,886,037 B1
(45) Date of Patent: Apr. 26, 2005

(54) CHANNEL DIRECTOR FOR CROSS-CHANNEL CUSTOMER INTERACTIONS

(75) Inventors: Thomas G. Brewer, Lexington, SC (US); Nelson H. Yount, Lexington, SC (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/540,502

(22) Filed: Mar. 31, 2000

(51) Int. Cl.$^7$ .............................................. G06F 15/173
(52) U.S. Cl. ...................... 709/223; 709/217; 709/229; 379/265
(58) Field of Search ................................. 709/223–226, 709/229, 217, 201; 379/265, 265.09

(56) References Cited

U.S. PATENT DOCUMENTS

| | | | |
|---|---|---|---|
| 5,335,352 A | | 8/1994 | Yanai et al. |
| 5,608,446 A | | 3/1997 | Carr et al. |
| 5,710,887 A | * | 1/1998 | Chelliah et al. ............... 705/26 |
| 5,717,923 A | | 2/1998 | Dedrick |
| 5,724,522 A | | 3/1998 | Kagami et al. |
| 5,742,789 A | | 4/1998 | Ofer et al. |
| 5,771,355 A | | 6/1998 | Kuzma |
| 5,815,665 A | | 9/1998 | Teper et al. |
| 5,828,666 A | | 10/1998 | Focsaneanu et al. |
| 5,845,070 A | * | 12/1998 | Ikudome ...................... 713/201 |
| 5,848,396 A | | 12/1998 | Gerace |
| 5,850,446 A | | 12/1998 | Berger et al. |
| 5,855,018 A | | 12/1998 | Chor et al. |
| 5,862,339 A | | 1/1999 | Bonnaure et al. |
| 5,961,601 A | * | 10/1999 | Iyengar ....................... 709/229 |
| 6,035,332 A | * | 3/2000 | Ingrassia et al. ............. 709/224 |
| 6,131,810 A | * | 10/2000 | Weiss et al. .................. 235/379 |
| 6,170,017 B1 | * | 1/2001 | Dias et al. ................... 709/235 |
| 6,223,215 B1 | * | 4/2001 | Hunt et al. ................... 709/217 |
| 6,230,197 B1 | * | 5/2001 | Beck et al. ................... 709/223 |
| 6,334,110 B1 | * | 12/2001 | Walter et al. .................. 705/14 |
| 6,349,290 B1 | * | 2/2002 | Horowitz et al. .............. 705/35 |
| 6,377,944 B1 | * | 4/2002 | Busey et al. .................... 707/3 |
| 6,381,640 B1 | * | 4/2002 | Beck et al. ................... 709/223 |
| 6,473,740 B1 | * | 10/2002 | Cockrill et al. ................ 705/27 |
| 6,556,997 B1 | * | 4/2003 | Levy ............................ 707/10 |
| 6,584,191 B1 | * | 6/2003 | McPartlan et al. ...... 379/265.02 |
| 6,665,395 B1 | * | 12/2003 | Busey et al. ........... 379/265.09 |

* cited by examiner

Primary Examiner—David Wiley
Assistant Examiner—Phuoc H. Nguyen
(74) Attorney, Agent, or Firm—Schwegman, Lundberg, Woessner & Kluth, P.A.

(57) ABSTRACT

Methods and an apparatus are provided for directing and managing cross-channel interactions with a customer. A customer makes multiple contacts with a business over first and second channels. These contacts are electronically represented as first and second interactions which are recorded in a single dialogue. The dialogue is evaluated so as to modify at least one of the interactions or channels. Further, a business service provider is connected to an interaction based upon the subject matter of the interaction and the channel over which the interaction is occurring. A service provider's actions with a customer are validated based upon such things as business policy, customer profile, customer privacy, channels, the skill set of the service provider, and the subject matter of the interactions. A service provider may also extract from a customer profile database a customer with whom an interaction is established.

4 Claims, 11 Drawing Sheets

CHANNEL DIRECTOR FOR CROSS-CHANNEL CUSTOMER INTERACTIONS

FIELD OF THE INVENTION

The present invention relates to methods and an apparatus used to capture and evaluate concurrent electronic interactions occurring between a customer and a service provider over multiple communication channels, thereby enhancing the interactions and the channels.

BACKGROUND OF THE INVENTION

Businesses have traditionally attempted to automate and customize the way in which they interact with a customer. Customers contact a business through a variety of media. Often these media are referred to as "channels," some of these channels include customer interactions made via: email, cable, satellite, fax, kiosk, Internet, or directly in person (hereinafter "walk-up"). Software is often deployed to transform customer contacts into interactions which are electronic representations of the communications occurring with a customer during a contact with a business. This may be accomplished by transcribing the communications by a business representative either during or after the contact, or may be readily apparent to a business software process when the customer is communicating through a business provided interface or device, such as an automated telephone menu or an electronic form. Converting these customer contacts into an electronic media permits businesses to evaluate and improve future customer contacts.

By improving the way in which a business interacts with a customer over a channel, the business improves its customer relationship thereby increasing the likelihood of retaining an existing customer, and potentially generating additional business from the customer. This process of improving and customizing customer relationships is often referred to as "customer intimacy."

Businesses have also sought to reduce operating expense associated with customer communications. Believing that technology can assist in achieving customer intimacy as well as reducing operating expenses, businesses have developed a variety of technologies to personalize and automate customer interactions with the business. Some of these technologies include automated telephone support, automatically generating an email response, and world wide web (WWW) form processing.

Furthermore, businesses have recently sought to take advantage of the tremendous activity on the WWW by attempting to capture as much information about their existing or potential customers as possible and then warehousing this profile information in an electronic database. Intelligent software agents are being developed to mine the warehouse so as to create focused marketing and interactions with the customers. However, businesses are now recognizing that they have multiple databases with customer profile information and no cost effective means to have these disparate databases communicate with each other so as to present a comprehensive view of a single customer. Additionally, efforts seem to be disproportionately focused on interactions with customers which occur over a WWW channel. Along these same lines, business policies are difficult to enforce consistently when customers interact with a business over a variety of channels because the technology does not inter-operate well enough to permit consistent treatment of cross channel interactions with the customer.

An additional consideration impacting a business's efforts to capture customer profile information is the concern for customer privacy. As a result of this concern, federal agencies have begun developing privacy guidelines associated with electronic privacy. Additionally, some foreign countries have enacted stringent laws with respect to customer privacy. Businesses must develop applications which are flexible enough to respond to this growing tide of public sentiment.

Still, some attempts have been made at channel integration (often referred to as "media blending"). These attempts focus on publishing customer interactions across several channels upon completion of an interaction with no attempt made to capture multiple concurrent interactions with the customer on cross channels. Thus, prior methods do not permit near-term use of the customer interactions to enhance the current customer interaction. Further, these prior methods fail to capture all customer interactions occurring over cross channels. These failures result in customer interactions which fall between the cracks. The result of this is that businesses are not capable of presenting a comprehensive 360 degree view of their customers.

Finally, the explosion of technology and the ease of electronic communication have created an added pressure on businesses to provide to its customers all possible channels within which the customer can contact the business. Yet, the addition of new channels create stovepipes of operations that complicate managing the customer relationship and add overhead expense associated with the maintenance and support of the new channels of communication. Additionally, business have found it exceedingly difficult to connect customers to the appropriate business service provider as the subject matter and the channel associated with a customer interaction changes.

Accordingly, it is apparent that methods and an apparatus that permit near-term responses to a customer based upon cross channels of communication will allow for a closed-loop view of the customer and prevent interactions from falling between the cracks. This will engender greater customer intimacy by providing a comprehensive view of the customer (360 degrees). Further, it is apparent that any such method or apparatus must be mindful of business policies, and customer privacy.

SUMMARY OF THE INVENTION

Accordingly, it is an object of the present invention to overcome prior methods and/or apparatus to provide cross-channel customer interactions which are captured and evaluated so as to modify at least one of the channels or interactions occurring with the customer. It is a related object to modify at least one of the channels or interactions while the customer remains in contact with the business during a session with the business, so as to provide near-term responses to the customer. It is a further object of the present invention to permit customer interactions to be stored in a customer profile database. Customers can be identified by extracting information from the customer profile database and a business service provider identified. The service provider can then initiate an interaction with the customer. A final object of the present invention permits the cross-channel interactions of a customer to be connected with business service providers based upon of the subject matters and channels associated with the interactions.

To achieve the forgoing and other objects, a method for managing the cross-channel interactions of a customer are provided. The method comprises identifying a first interaction on a first channel and a second interaction on a second channel, identifying a customer associated with the interactions; recording a dialogue corresponding to the first and second interactions, and using the dialogue to modify at least one of the interactions.

In a preferred embodiment, shown in FIG. 1, an external customer 75 initiates multiple contacts with a business through a first channel$_1$ 320 and a second channel$_2$ 330. A Contact Manager 20 detects the contacts and determines if the contacts are existing interactions switching channels or new interactions. If the contacts are existing interactions switching channels then the interactions are updated to reflect the new channels over which the interactions are occurring. If the contacts are new interactions, the first channel$_1$ 320 is associated with a first interaction$_1$ 340, and the second channel$_2$ 330 is associated with a second interaction$_2$ 380. These two interactions are captured as a dialogue 60. A Connection Manager 140 assigns a first business service provider$_1$ 1160 to the first interaction$_1$ 340 and a second business service provider$_2$ 1170 to the second interaction$_2$ 380. The dialogue 60 is then evaluated so as to modify interaction$_1$ 340 to establish interaction$_1$' 350 and interaction$_2$ 380 is modified to establish interaction$_2$' 390. Likewise, channel$_1$ 320 is modified to reflect channel$_1$' 360 and channel$_2$ 330 is modified to reflect channel$_2$' 370.

In a further embodiment, the invention is directed to apparatus for managing cross-channel interactions of a customer. The apparatus comprises a processor, a customer, a plurality of devices interfaced to the processors, means for identifying a first interaction on a first channel of one of the devices and a second interaction on a second channel of another of the devices, means for recording a dialogue corresponding to the first and second interactions, means for associating the customer with the first and second interactions, and means for using the dialogue to modify at least one of the interactions.

In the preferred embodiment, again referring to FIG. 1, an external customer 75 establishes a connection to a business through device$_1$ 400 and device$_2$ 410. Device$_1$ 400 will translate through a contact manager 20 to channel$_1$ 320 while device$_2$ 410 will translate to channel$_2$ 330. The remaining description of this embodiment is discussed above with the initial reference to FIG. 1.

In yet another object of this invention, a method is provided for managing the cross-channel interactions of a customer while the interactions are occurring. The method comprises: establishing a session including a first interaction on a first channel and a second interaction on a second channel, identifying a customer associated with the interactions; recording a dialogue associated with the first interaction and the second interaction during the session, and modifying at least one of the interactions using the dialogue before the session terminates.

FIG. 1 illustrates a session 420 for the preferred embodiment of this invention. The session 420 illustrates a period of time during which an external customer 75 and a business are interacting. During the session 420, interaction$_1$ 340 and channel$_1$ 320 are modified as interaction$_1$' 350 and channel$_1$' 360 based on a dialogue 60.

A further object provides a method for customizing customer interactions which are initiated from a service provider. The method comprises providing a customer profile database, storing in the customer profile database a plurality of dialogues occurring with a customer, initiating a service provider, and establishing an interaction initiated by the service provider with a customer extracted from the customer profile database wherein the interaction occurs over a channel.

In a preferred embodiment, FIG. 2, a service provider is initiated in step 230. Dialogues in step 290 are recorded in a customer profile database in step 250. The initiated service provider in step 230 extracts a customer from the customer profile database in step 266. In step 270 an interaction on a channel is created, and in step 280 the interaction is updated with the identity of a particular customer with whom the service provider wishes to interact. In step 290 a connection is made to the customer. The interaction then proceeds between the service provider and the customer with actions that are taken by the service provider validated in step 300. Finally, in step 310 the entire interaction is used to update the customer profile database.

A remaining object of this invention provides a method for connecting a customer interaction to a service provider based upon the interaction and the subject matter of the interaction. The method comprises establishing a first interaction on a first channel and a second interaction on a second channel with a customer, identifying a first subject matter associated with the first interaction and a second subject matter associated with the second interaction, selecting a first service provider for the first interaction based upon the first subject matter and the first channel, selecting a second service provider for the second interaction based upon the second subject matter and the second channel, connecting the first service provider to the customer through the first interaction, and connecting the second service provider to the customer through the second interaction.

In a preferred embodiment, FIG. 3, a first contact is identified in step 1180 and second contact is identified in step 1190. The identify of a first channel and a second channel are determined in steps 1200 and 1210 respectively. A first interaction is created in step 1220 and a second interaction in step 1230. The interactions are tracked in a dialogue in step 1240. The customer associated with the interactions and the dialogue is located in step 1270. Once the customer is identified the interactions are updated to reflect this in step 1280. As the dialogue proceeds the identity of first subject matter associated with the first interaction will be identified in step 1250. Correspondingly, a second subject matter associated with the second interaction will be identified in step 1260. Based upon the subject matter of the interactions, first and second service providers are selected to communicate with the customer in steps 160 and 170 respectively.

Still other objects of the present invention will become apparent to those skilled in this art from the following description wherein there are shown and described preferred embodiments of this invention, simply for purposes of illustration. As will be realized, the invention may take on other aspects and arrangements than those described in detail below without departing from scope of the invention, as defined by the claims.

BRIEF DESCRIPTION OF THE DRAWINGS

While the specification concludes with claims particularly pointing out and distinctly claiming the invention, it is believed that the invention will be better understood from the following description taken in conjunction with the accompanying drawings in which:

DETAILED DESCRIPTION OF PREFERRED EMBODIMENTS

The preferred operating system of this invention is Microsoft Corporation's Windows NT operating system, and the preferred programming language used to implement the present invention is C++. The preferred programming method used to implement the present invention is Object Oriented Analysis and Programming (OOAP).

This invention is best understood by those skilled in the art through OOAP techniques as opposed to traditional structured programming techniques. The OOAP techniques will permit the objects to support data abstraction/encapsulation, polymorphism, and inheritance. This technique permits real world entities to be encapsulated and abstracted into software representations called objects. Once the interfaces and methods of these objects are known, they may be assembled in a variety of structured ways to achieve results.

In a preferred embodiment of this invention the primary real world entities represented with software objects comprising Interaction Objects 30, Dialogue Objects 60, Customer Objects 70, and Service Provider Objects 100. Interaction Objects 30 are software representations of communications occurring during a business contact. They may be automatically detected in the situation where the contacts are using business provided interfaces, or they may be transcribed into a business provided interface by a business representative as they are occurring. Dialogue Objects 60 are software representations of multiple interactions occurring with a single customer. Customer Objects 70 are software representations of external customers, some of which may initially be anonymous. Service Provider Objects 100 are software representations of business representatives. These may be representations of human entities or software entities such as intelligent agents designed to do automated tasks such as generating email responses to customer requests.

Figure 1:
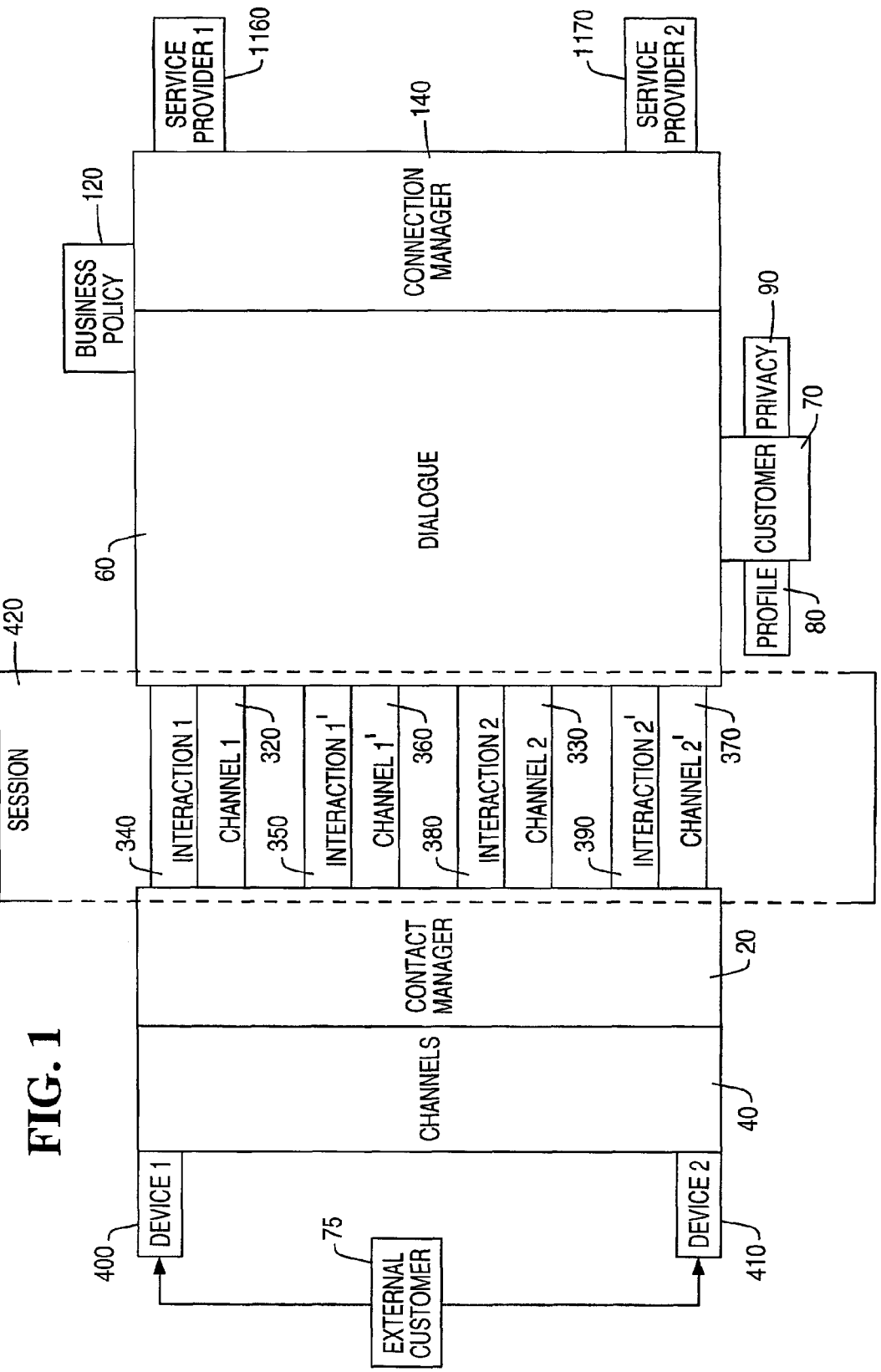
FIG. 1 illustrates a preferred embodiment of the present invention.

FIGS. 1 through 4 illustrate a preferred embodiment of the architecture and the object interfaces in accordance with the present invention. FIG. 1 illustrates a first interaction$_1$ 340 and a second interaction$_2$ 380 occurring over a first channel$_1$ 320 and a second channel$_2$ 380 recorded in a Dialogue Object 60. The Dialogue Object 60 is evaluated to modify the first interaction$_1$ 340 and the second interaction$_2$ 380 producing interaction$_1$ 250 and interactions, respectively. The Dialogue Object 60 is also evaluated to modify the first channel$_1$ 320 and the second channel$_2$ 330 producing channel$_1$ 360 and channel$_2$ 370, respectively. Further, an external customer 75, makes contact to one of the devices (device$_1$ 400) and a contact to another of the devices (device$_2$ 410). The modifications to the interactions and the channels can occur during a session 420 with an external customer 75.

Figure 2:
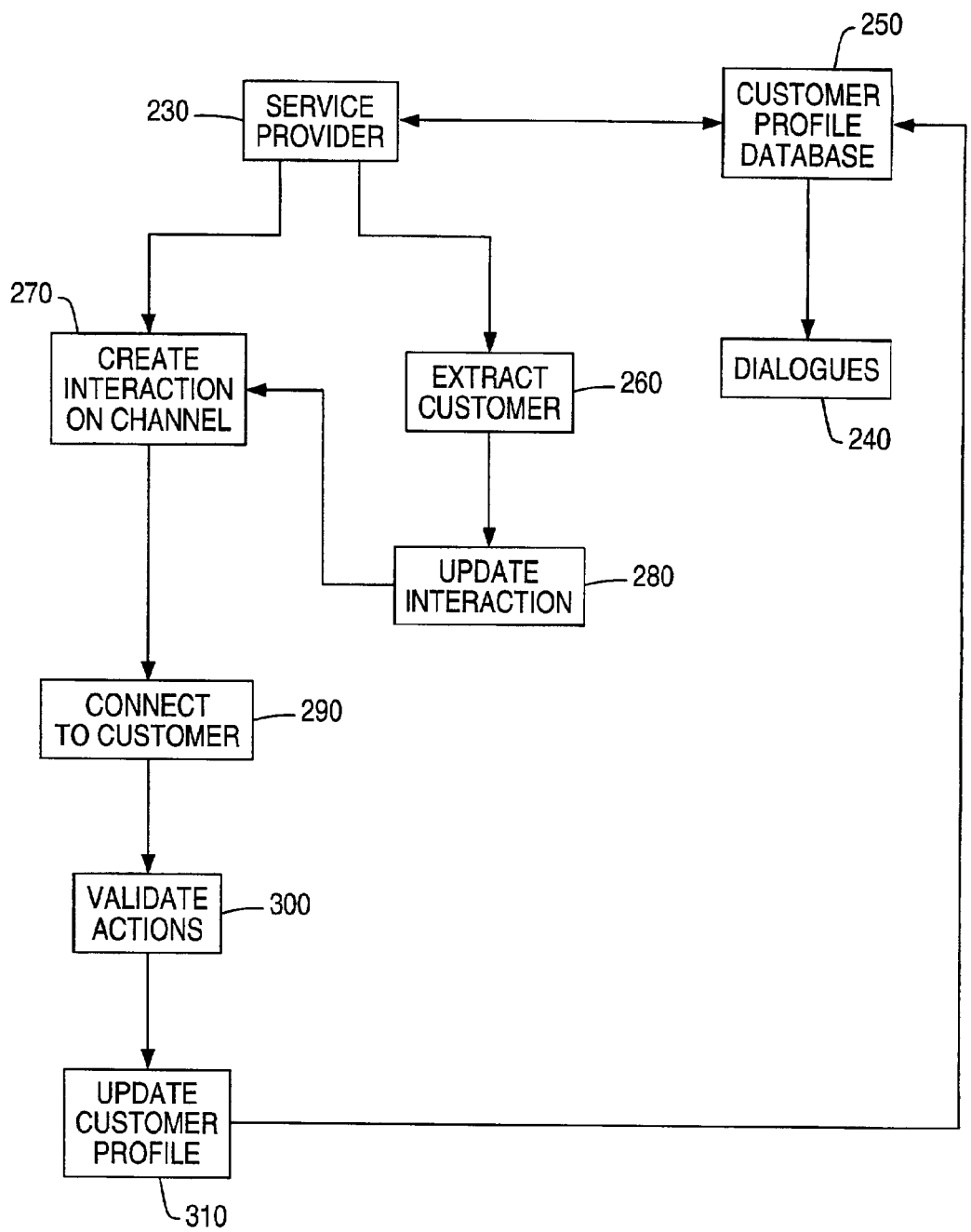
FIG. 2 illustrates a flow diagram depicting the steps in an embodiment of the present invention showing methods wherein a service provider initiates an interaction with a customer.

FIG. 2 is a flow diagram depicting the steps in a method in which a service provider initiates an interaction with a customer. A customer profile database is provided in step 250. The customer profile database includes a plurality of dialogs 240 stored therein. A service provider 230 initiates an interaction with a customer in step 270. The specific customer in which an interaction is desired to be connected to is acquired by extracting/locating the customer from the customer profile database in step 260. The customer is identified to the interaction by updating the interaction in step 280. In step 290, the service provider initiates a connection to the customer and the interaction between the two entities begins. As the interaction proceeds, a service provider will either be prompted to take actions by the Content Analysis Object 130 or will take actions on its own. These actions are validated using criteria such as customer profile, privacy policy, business policy, channel limitations, and the subject matter of the interaction occurring. Once proposed actions by a service provider are authorized, the customer profile database may be updated in step 310.

Figure 3:
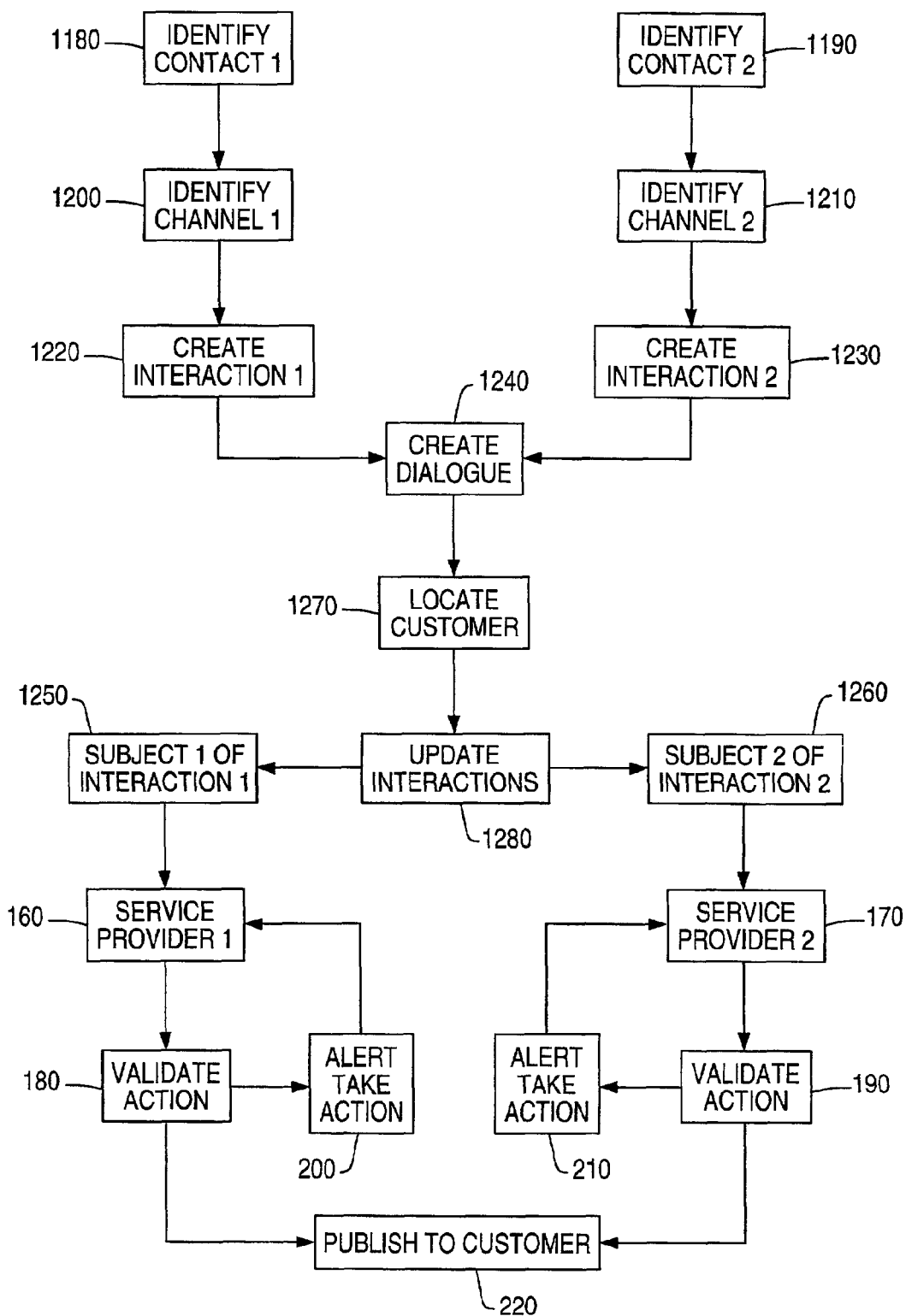
FIG. 3 illustrates a flow diagram depicting the steps in an embodiment of the present invention showing methods wherein a service provider is connected to an interaction.

FIG. 3 illustrates a flow diagram depicting a preferred embodiment wherein the connection of a service provider to a customer is determined based upon the subject matter of the interaction and the actions transpiring within the interaction. Identification of contact$_1$ and contact$_2$ are established in steps 1180 and 1190, respectively. Next, a first channel$_1$ and a second channel$_2$ are identified in steps 1200 and 1210, respectively. A first interaction$_1$ and a second interaction$_2$ are created in steps 1220 and 1230, respectively. A dialogue is established in step 1240. Customers are located in step 1270 and the interactions are evaluated to identify subjects associated with each of the interactions in steps 1250 and 1260, respectively. A first service provider$_1$ and a second service$_2$ are identified and associated with the interactions in steps 160 and 170, respectively. The service providers are selected based upon the subject matter of the interactions and the actions that are transpiring over the interactions such as technical questions from customer requiring the attention of a business's technical staff. Steps 180 and 190 validate all actions taken by the service providers to comport with business policies, customer profiles, channel limitations, and customer privacy. Based on actions occurring within a dialogue the service provider may be prompted to take actions in steps 200 and 210. Finally, all actions occurring within the dialogue for each of the concurrent interactions are recorded as an update to the customer profile in step 220.

Figure 4:
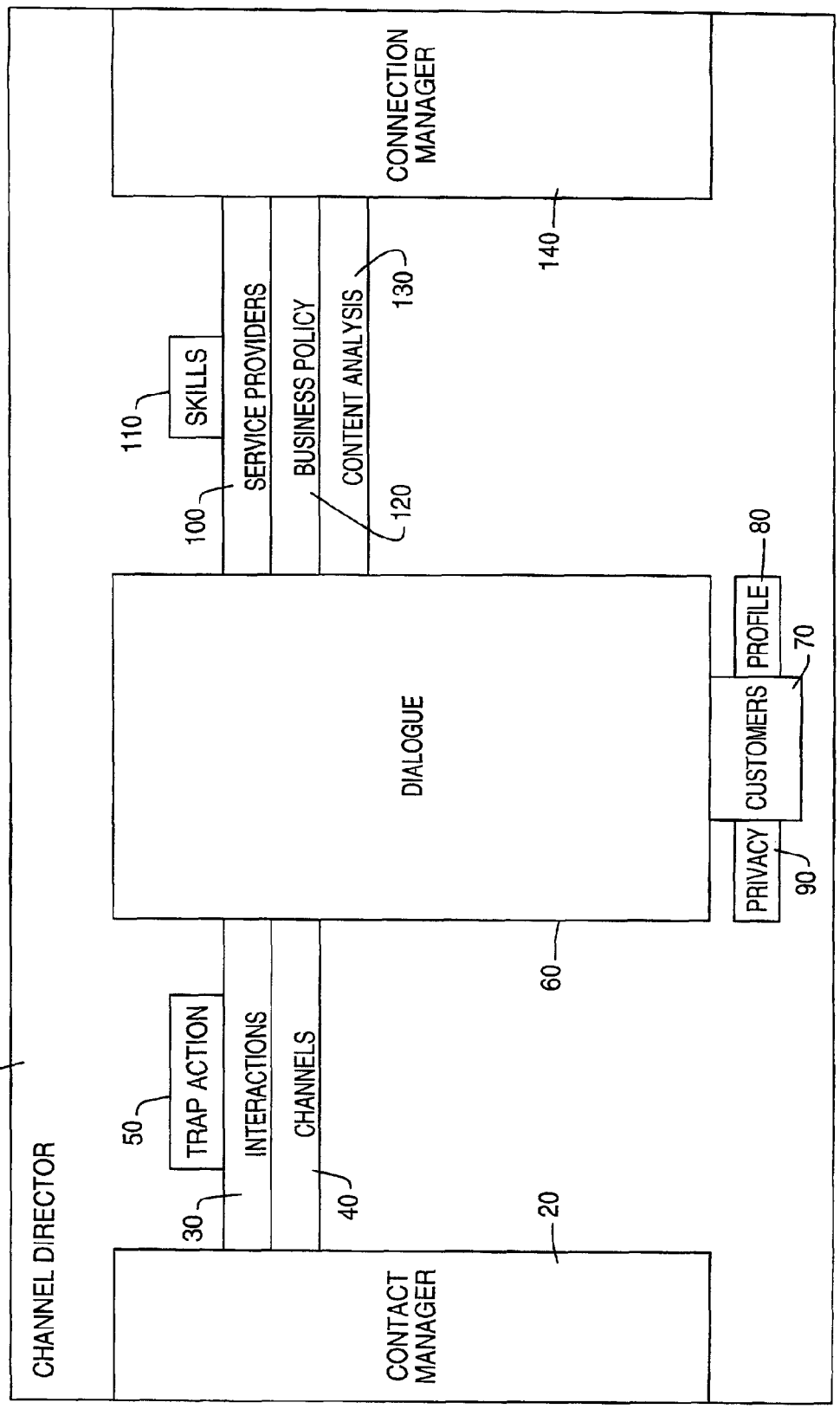
FIG. 4 illustrates a preferred architecture of the present invention.

FIG. 4 is a preferred architecture depicting the software objects and the object interfaces of the present invention. A Channel Director Object 10 is primarily responsible for coordinating and managing all Dialogue Objects 60 occurring within a business enterprise. The Channel Director Object 10 binds multiple Interaction Objects 30 with a single Customer Object 70 into a single Dialogue Object 60. Customer Objects 70 in turn contain Privacy Objects 90 and Profile Objects 80. Privacy Objects include representations reflecting a particular Customer Object's 70 preferences such as preferred response channel; preferred payment method; name, address, etc. Further, Privacy Objects 90 include representations of a Customer Object's 70 privacy requirements such as secured socket layer communication, password protection access, no email solicitations, etc.

Interaction Objects 30 are associated with a specific Customer Object 70 and a specific Channel Object 40. Interaction Objects 30 are established by the Contact Manager Object 20. Electronic information occurring between a Customer Object 70 and a Service Provider Object 100 is recorded within a Trap Action Object 50 which is bound to an Interaction Object 30. These electronic information units are then communicated by the Dialogue Object 60 to a Content Analysis Object 130 which is bound to a Dialogue Object 60. The Content Analysis Object 130 will evaluate the electronic information units recorded in the Trap Action Objects 50 for all Interaction Objects 30 occurring within a single Dialogue Object 60 using the Privacy Object 90, the Profile Object 90, the Skills Object 110, and the Business Policy Object 120. Once evaluated, the Content Analysis Object 130 will validate any actions a Service Provider Object 100 attempts to take with a Customer Object 70 to ensure Business Policy Objects 120, customer Profile Objects 80, customer Privacy Objects 90, and service provider Skills Objects 110 comport with any proposed action by the Service Provider Object 100. Additionally, the Content Analysis Object 130 will alert the Service Provider Object 100 to take certain actions based upon the evaluated subject matter of a Dialogue Object 60. Further, the Content Analysis Object 130 may request that a different Service Provider Object 100 be bound to an Interaction Object 30 based upon the subject matter of an Interaction Object 30 or the actions occurring within an Interaction Object 30.

A Connection Manager Object 140 will establish initial connections to Interaction Objects 30 and Service Provider Objects 100. It is also responsible for using the Business Policy Object 120 and the Skills Object 110 in selecting the most appropriate Service Provider Object 100 for a particular Interaction Object 30. The Connection Manager Object 140 also manages the load of the Service Provider Objects 100 to ensure overall system performance.

A Business Policy Object 120 provides information related to things such as, but not limited to, customer wait time; maximum interactions per channel; customer dispute procedure; and customer refund policy. Each Service Provider Object 100 has a set of Skills Objects 110 which identify the capabilities of the Service Provider Object 100 including such things as authorized channels, approval authority, technical capabilities, and maximum number of interactions permitted.

As one skilled in the art will appreciate, and as will be more fully explained below, the architecture described above will readily permit multiple occurring interactions with a customer over cross-channels to be normalized into a single electronic dialogue. The dialogue may then be evaluated to perform a number of actions such as modifying the interaction; modifying the channel; providing near-term feedback to a customer by performing modifications during a session with the customer; and selecting a service provider based upon the interaction and the subject matter of the interaction.

This will permit business enterprises to enhance customer intimacy by substantially automating customer interactions so as to reduce and focus human intervention thereby reducing operating expenses. It further, provides for a complete 360 degree view of a customer with no interactions of a customer falling through the cracks when interactions occur over cross channels within the business enterprise.

The remaining detailed description includes a description of each object; the object interfaces; and the methods available with each object.

Figure 5:
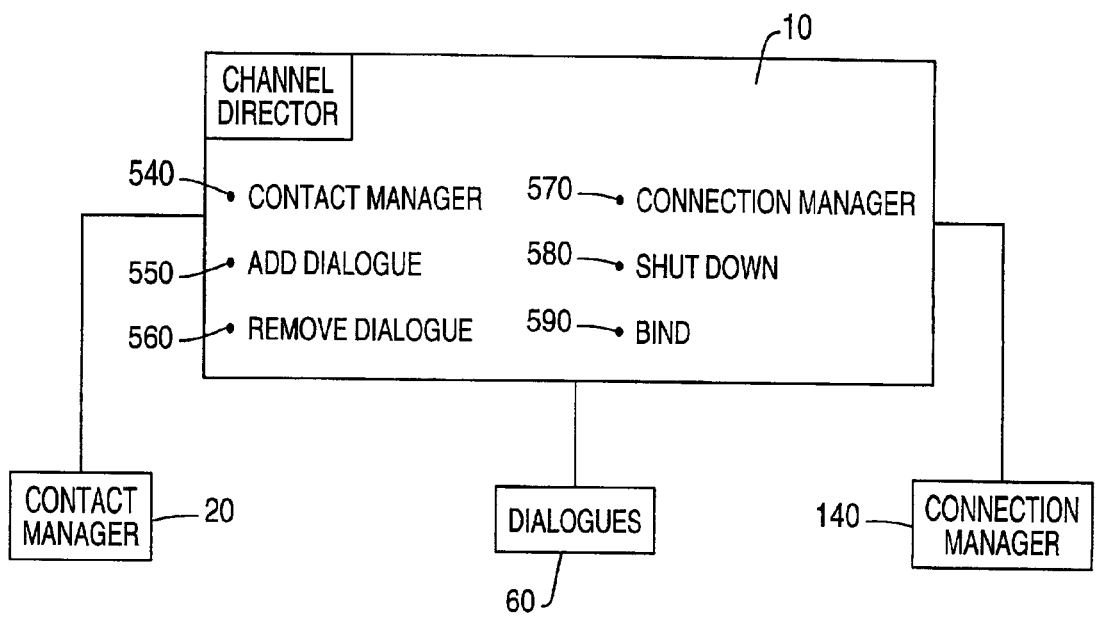
FIG. 5 illustrates a hierarchical view and methods associated with a Channel Director Object in accordance with the present invention.

The hierarchical view of the Channel Director Object 10 is illustrated in FIG. 5 along with the corresponding methods associated with the Channel Director Object 10. The Channel Director Object 10 is the highest level object of a preferred embodiment depicted in FIG. 4. This object coordinates activities amongst the Contact Manager Object 20, a plurality of Dialogue Objects 60 and a connection Manager Object 140. Further, the Channel Director Object 10 permits the binding of initially anonymous Interaction Objects 30 to an ongoing Dialogue Object 60 associated with a particular Customer Object 80. As FIG. 5 shows, the Channel Director Object 10 instantiates a single Contact Manager Object 20, a plurality of Dialogue Objects 60, and a single Connection Manager Object 140.

The methods of the Channel Director Object 10 include a Contact Manager Object method 540, a Connection Manager Object method 570, an AddDialogue method 550, a RemoveDialogue method 560, a Shutdown method 580, and a Bind method 590. The Contact Manager Object method 540 and the Connect Manager Object method 570 simply permit a Contact Manager Object 20 and a Connection Manager Object 140 to be bound to the Channel Director Object 10. These derived objects will also be capable of accessing the Channel Director Object's 10 methods through normal inheritance. The AddDialogue method 550 and the RemoveDialogue method 560 permit Dialogue Objects 60 to be added and removed, respectively. The Shutdown method 580 permits a Channel Director 10 to gracefully close down which would permit recovery in the event of failures.

Finally, the Bind method 590 allows an Interaction Object 30 to bind with a particular Dialogue Object 60. This permits interactions occurring with an anonymous Customer Object 70 to continue as anonymous until the Interaction Action Object 30 can identify through the trapping of electronic messages and its corresponding Customer Object method 1160 (FIG. 14) the identity of the customer. Once the identity of the customer is known the Interaction Object 30 can join a Dialogue Object 60.

Figure 6:
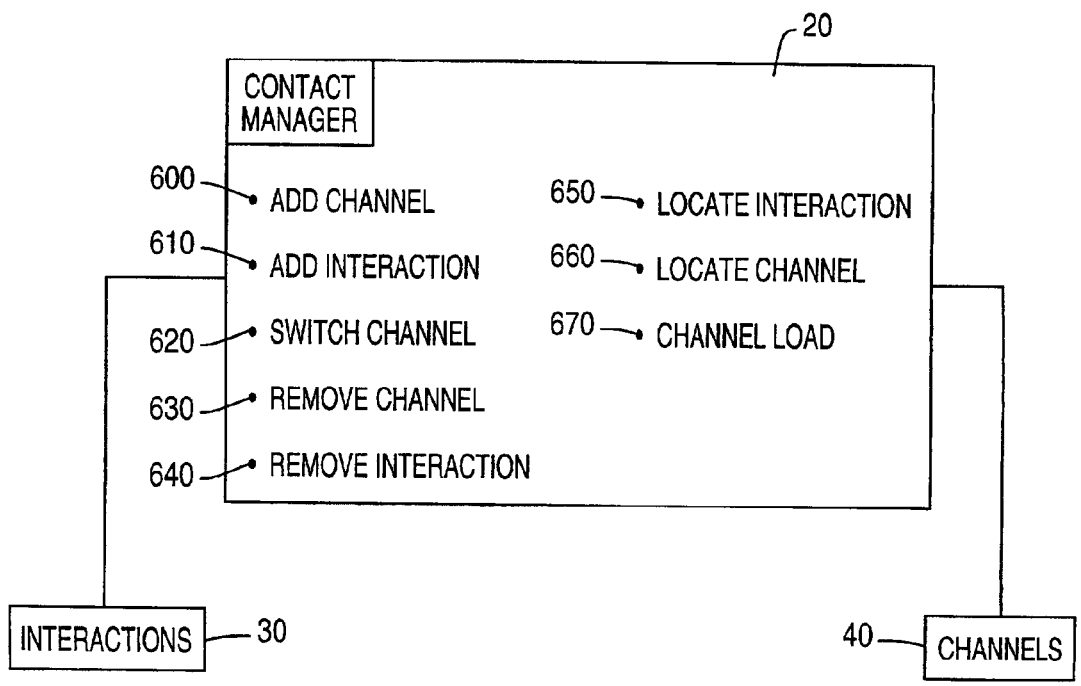
FIG. 6 illustrates a hierarchical view and methods associated with a Contact Manager Object in accordance with the present invention.

The Contact Manager Object 20 (FIG. 6) is derived from the Channel Director Object 10 and comprises Channel Objects 40 and Interaction Objects 30. The Contact Manager Object 20 is initiated such that it is aware of all the devices through which an external customer 75 may contact the business. Each device is associated with a channel that is initially bound to the Contact Manger Object 20. The Contact Manager Object 20 monitors the channels coming into an organization for a contact to be made. The Contact Manager Object 20 comprises an AddChannel method 600, an AddInteraction method 610, a SwitchChannel method 620, a RemoveChannel method 630, a RemoveInteraction method 640, a LocateInteraction method 650, a LocateChannel method 660, and a ChannelLoad method 670. The AddInteraction 610 and AddChannel 600 methods permit the adding of Interaction Objects 30 and Channel Objects 40, respectively. The RemoveInteraction 640 and RemoveChannel 630 methods permit the removal of Interaction Objects 30 and Channel Objects 40, respectively. The SwitchChannel method 620 permits the Contact Manager Object 20 to change a channel associated with an Interaction Object 30. This permits an existing interaction which is taking place with a customer to cross channels within a single interaction. The LocateInteraction 650 and LocateChannel 660 permit locating a particular Interaction Object 30 or Channel Object 40, respectively. Finally, the ChannelLoad method 670 allows the Contact Manager Object 20 to query a specific Channel Object 40 and determine the current load of that object, this will permit the Contact Manager Object 40 to maintain load balancing across all channels and permit a customer to switch channels should a particular channel become idle or drop.

Figure 7:
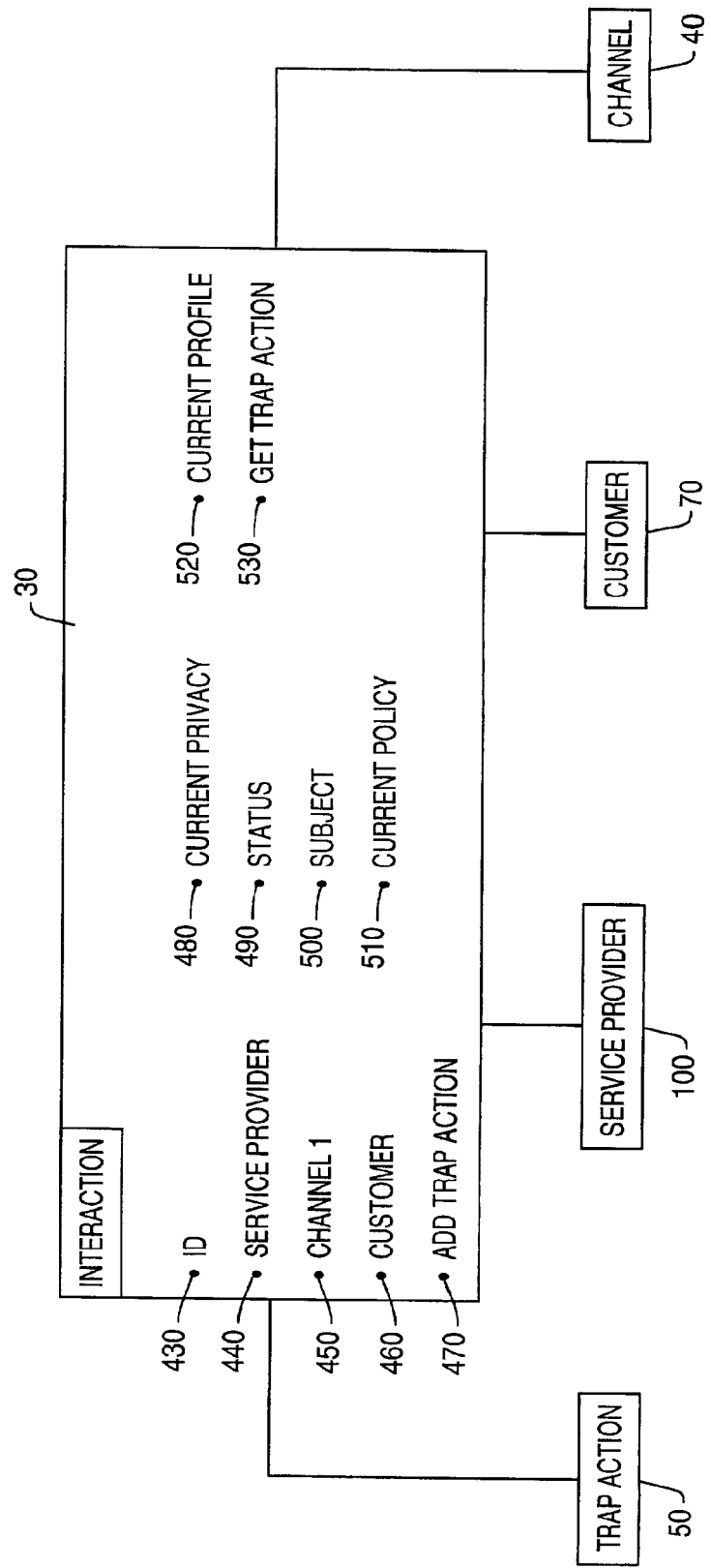
FIG. 7 illustrates a hierarchical view and methods associated with an Interaction Object in accordance with the present invention.
Figure 8:
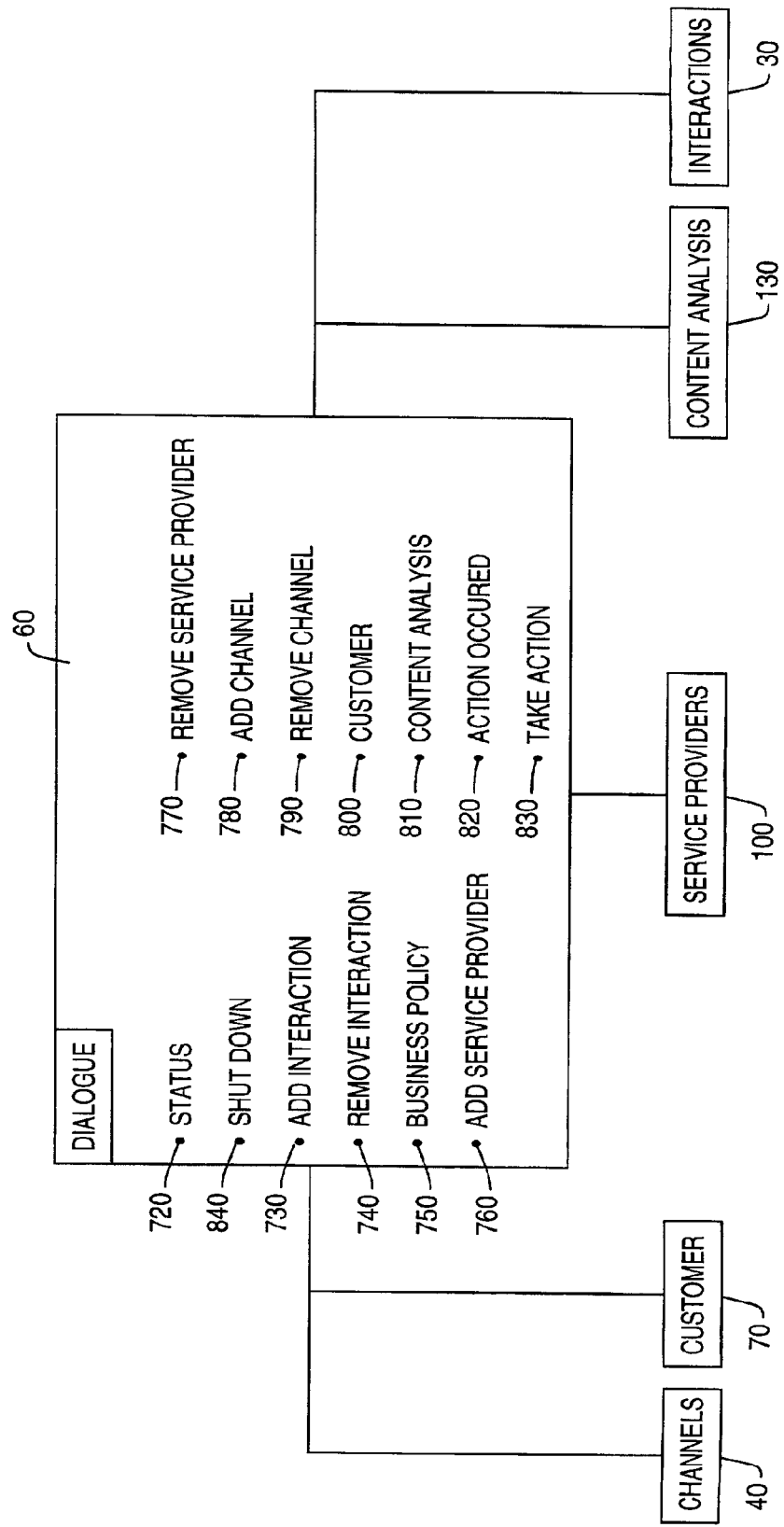
FIG. 8 illustrates a hierarchical view and methods associated with a Dialogue Object in accordance with the present invention.

FIG. 7 illustrates a preferred Interaction Object 30. The Interaction Object 30 is derived from a Contact Manager Object 20. Accordingly the Interaction Object 30 has the operations associated with the Contact Manager Object 20 at its disposal through the properties of inheritance as well as the operations of the Channel Director Object 10. The Interaction Object Comprises 30 a TrapAction Object 50, a Service Provider Object 100, a Customer Object 70 and a Channel Object 40. FIG. 7 further illustrates a set of methods which are available with an Interaction Object 30. These methods comprise an ID method 1110, a Service Provider Object method 1120, a Channel Object method 1130, a Customer Object method 1140, an AddTrapAction method 1150, a CurrentPrivacy method 1160, a Status method 1170, a Subject method 1180, a CurrentPolicy method 1190, a CurrentProfile method 1200, and a GetTrapAction method 1210.

The ID method 430 returns a unique identifier associated with an Interaction Object 30. This method permits other objects to locate a particular interaction. Upon instantiation of an Interaction Object 30 an ID is created. The Service Provider Object method 440, the Channel Object method 450, and the Customer Object method 460 are nothing more than references to a Service Provider Object 100, a Channel Object 40, and a Customer Object 70, respectively. This permits the binding of these objects to a particular Interaction Object 30 and allows other objects to set or access these objects which are bound to a particular Interaction Object 30. The AddTrapAction method 470 permits electronic messages occurring between a customer and a service provider to be recorded with an Interaction Object 30. Correspondingly, the GetTrapAction method 530 permits other objects to access the last electronic message which occurred within an Interaction Object 30. This electronic message can then be stored or analyzed as discussed below by other objects. Further, a Status method 490 permits other objects in the system to query an Interaction Object 30 to determine the state that the Interaction Object 30. The states of an Interaction Object 30 comprise inactive, active, idle, and dropped. Also, a Subject method 500 permits the subject of an Interaction Object 30 to be set or queried. Finally, the CurrentPrivacy method 480, the CurrentPolicy 510, the CurrentProfile 520 correspond to customer privacy rules, business policy rules, and customer profile rules, respectively. These rules are particular to an Interaction Object 30 and are retrievable by other objects when actions are being performed to ensure the appropriateness and validity of actions occurring within an Interaction Object 30.

The Dialogue Object 60 comprises Channel Objects 40, a Customer Object 70, Service Provider Objects 100, a Content Analysis Object 130, and Interaction Objects 30. Multiple Interaction Objects 30 will be associated with a single Dialogue Object 60. These interactions are bound to the Dialogue Object 60 through the Channel Director Object's 10 Bind 590 method. Initially, an Interaction Object 30 may not be associated with a particular Customer Object 70, but once enough information contained in the TrapAction Object 50 exists to permit Customer Object 70 identification, the Interaction Object 30 will call the Channel Director Object's 10 Bind method 590 to bind to the Dialogue Object 60. When this binding occurs the appropriate Dialogue Object 60 will issue an AddInteraction 730 call which will then permit the Dialogue Object 60 to manage the Interaction Object 30 and keep track of electronic messages which are occurring within the Interaction Object 30 via the TrapAction Object 50.

Referring again to the Dialogue Object 60, an action (or electronic communication) occurring inside the Interaction Object 30 via the TrapAction Object 50 will cause an event to be raised to the Dialogue Object 60 which will precipitate an analysis to occur inside the Content Analysis Object 130. The Dialogue Object 60 is aware of all Interaction Objects 40 occurring within an dialogue and will issue a call to the Content Analysis Object 130 when the Dialogue Object's 60 has its ActionOcurred 810 method set.

Figure 9:
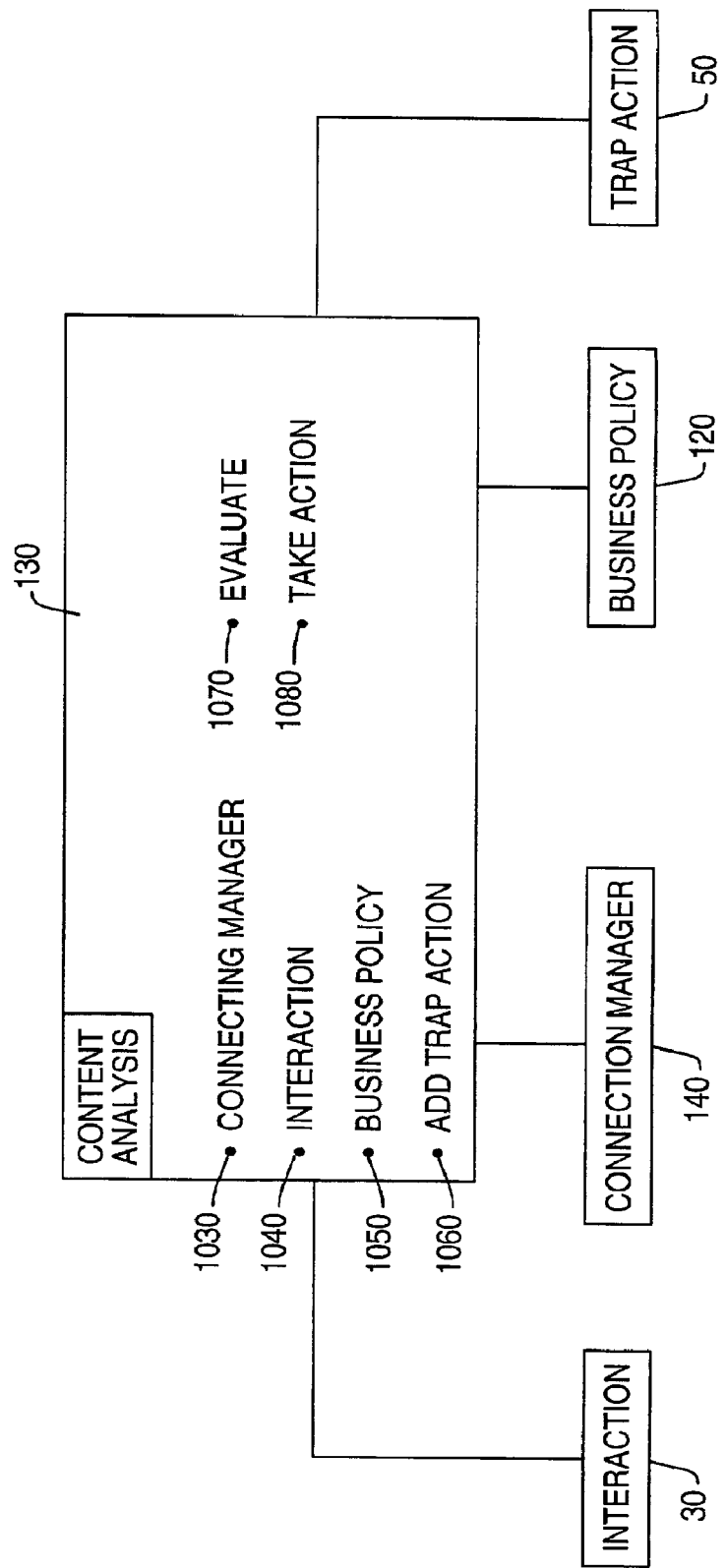
FIG. 9 illustrates a hierarchical view and methods associated with a Content Analysis Object in accordance with the present invention.

A preferred Content Analysis Object 130 is shown in FIG. 9. The Content Analysis Object 130 is responsible for evaluating-actions which are transpiring within a Dialogue Object 60. The Dialogue Object 60 knows from which interaction a particular action is occurring. The Content Analysis Object 130 records the actions and evaluates the actions to determine if subjects can be identified within the interaction and ensures the validity of actions that take place within an interaction. Business policies, customer profiles, and customer privacy will be enforced against any action which a Service Provider Object 100 attempts to take. In addition, the Content Analysis Object 130 can be used to change an existing Service Provider Object 100 by issuing an appropriate command. This object may also prompt, based upon business policy, a Service Provider Object 100 into taking a particular action with a Customer Object 70 during an interaction.

The Content Analysis Object 130 primarily interfaces with the Dialogue Object 60, the Connection Manager Object 140, and the Business Policy Object 120 as shown in FIG. 4. The object hierarchy of the Content Analysis Object 130 is shown in FIG. 9 and comprises an Interaction Object 30, a Connection Manager Object 140, a Business Policy Object 120, and Trap Action Objects 50. FIG. 9 also depicts the methods available with the Content Analysis Object 130. These methods comprise a Connection Manager Object method 1030, an Interaction Object method 1040, a Business Policy Object method 1050, an AddTrapAction method 1060, an Evaluate method 1070, and a TakeAction method 1080. The Connection Manager Object method 1030, the Interaction Object method 1040, and the Business Policy Object method 1050 permit the binding of the Connection Manager Object 140, the Interaction Object 30, and the Business Policy Object 120, respectively. Recording of electronic messages occurs within Trap Action Objects 50 and correspondingly the AddTrapAction method 1060 permits these messages to be stored for an entire Dialogue Object 60 which has multiple Interaction Objects 30 contained therein. The Evaluate method 1070 needs to perform a variety of functions.

Preferably, the Evaluate method 1070 will issue a new query upon each added Trap Action Object 50 to acquire a customer's Profile Object 80, Privacy Object 90 and the Business Policy Object 120. The Interaction Object 30 has methods as defined above which will define the customer and the current profile as well as the current privacy. The format of this information is discussed below with the Business Policy Object 120. This information combined with the actions occurring in the Trap Action Objects 50 will permit the Evaluate method 1070 to ensure actions which are initiated from a Service Provider Object 100 conform to business policy, customer profiles, and privacy requirements. Further, actions taken by an external customer 75 will often identify specific pre-defined subjects. Subjects can be identified in a plurality of situations such as being explicitly identified by a Service Provider Object 100, and set by a Customer Object 70 by traversing a web link whose address (URL) identifies a subject, such as "buyproducts.html." Further, as one skilled in the art would readily appreciate a variety of intelligent software agents could be used to identify the subject matter of electronic correspondences by using computational linguistic techniques to evaluate the underlying electronic correspondence. This identification of an Interaction Object's 30 subject matter will permit the Evaluate method 1070 to switch to a new Service Provider Object 100 if necessary or to prompt the existing Service Provider Object 100 to take a specific action such as call the help desk for support. The Skills Object 110 will identify subjects which a Service Provider Object 100 is conversant.

Finally, in FIG. 9 the Content Analysis Object 130 has a TakeAction method 1080 which permits communication to the Dialogue Object 60. This communication authorizes the Dialogue Object 60 to record and relay the action which the Content Analysis Object 130 is issuing to a Service Provider Object 100 which is bound to a particular Interaction Object 30 occurring within a single Dialogue Object 60.

Figure 10:
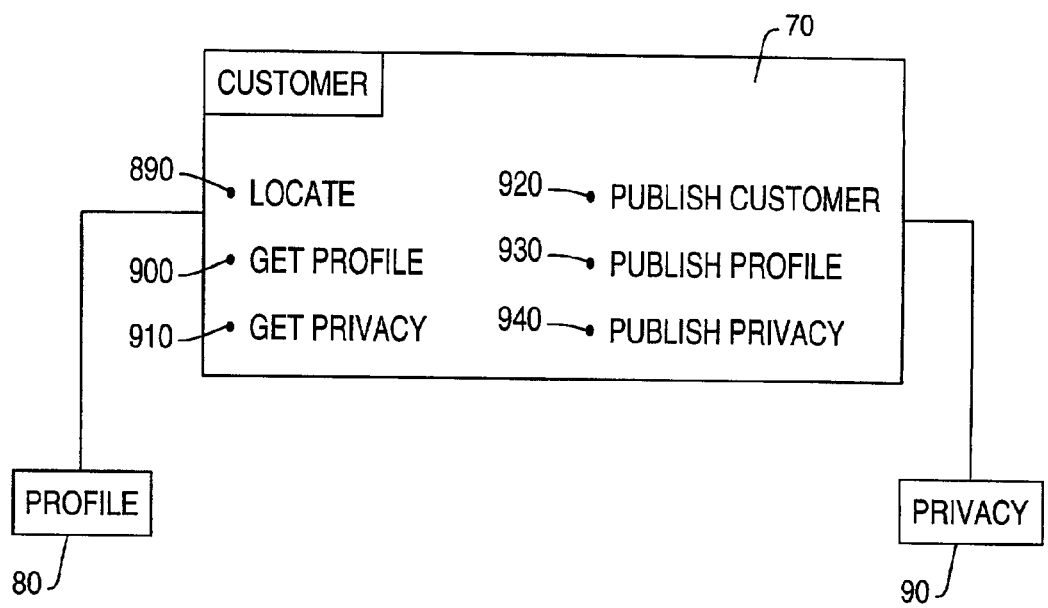
FIG. 10 illustrates a hierarchical view and methods associated with a Customer Object in accordance with the present invention.

FIG. 10 is a preferred Customer Object 70 in accordance with the present invention. The Customer Object 70 is responsible for maintaining customer information such as customer profiles and customer privacy requirements. If a specific customer is not identified, when a Customer Object 70 is initiated, it is an anonymous Customer Object 70. Upon queries issued to the anonymous Customer Object 70, it will transform itself into a particular Customer Object 70 and have available the customer profile and customer privacy at its disposal. In this way, an anonymous Customer Object 70 can also be used to add a new customer to the existing customers of the business through use of methods which permit a user of the Customer Object 70 to publish information. In the preferred embodiment, the Customer Object 70 has access to and knowledge of the customer profile database for the business organization thereby permitting the above disclosed functionality.

Referring to FIG. 10 a Customer Object 70 has an object hierarchy comprised of a Profile Object 80 and a Privacy Object 90. These objects are simple objects which interface with the underlying customer profile database and return fielded strings of numeric text as discussed below with the Business Policy Object 120. The customer profile is available to users of the Customer Object 70 via the GetProfile 900 method. The privacy information about a customer is available through the GetPrivacy 910 method. Correspondingly, a customer profile and customer privacy may be published and stored through the PublishProfile method 930 and the PublishPrivacy method 940, respectively. Further, a PublishCustomer method 920 permits a new customer to be created for the business enterprise. Finally, a Locate method 890 permits an anonymous Customer Object 70 to take a search query and use that query to find a particular customer in the customer profile database.

The Trap Action Object 50 is another simple object which simply converts the keystrokes and mouse clicks of computer screens into a fielded numeric string as discussed below with the Business Policy Object 120. This normalization of the electronic messages transpiring between a customer and a service provider permits the Content Analysis Object 130, as described above, to evaluate and take actions so as to modify the interactions, the channels, and assist in selecting a service provider on the basis of the subject matter of the interaction.

As one skilled in the art will readily appreciate the Content Analysis Object 130 and its corresponding Evaluate method 1070 will permit a variety of customized responses to a customer including modifying an interaction by forcing an action on the Service Provider Object 100; selecting a Service Provider Object 100 on the basis of an interaction's subject matter; enforcing privacy, customer profiles, and business policy on interactions taken from a Service Provider Object 100; alerting the Service Provider Object 100 to take a particular action; and modifying a channel should an interaction request such an action.

Figure 11:
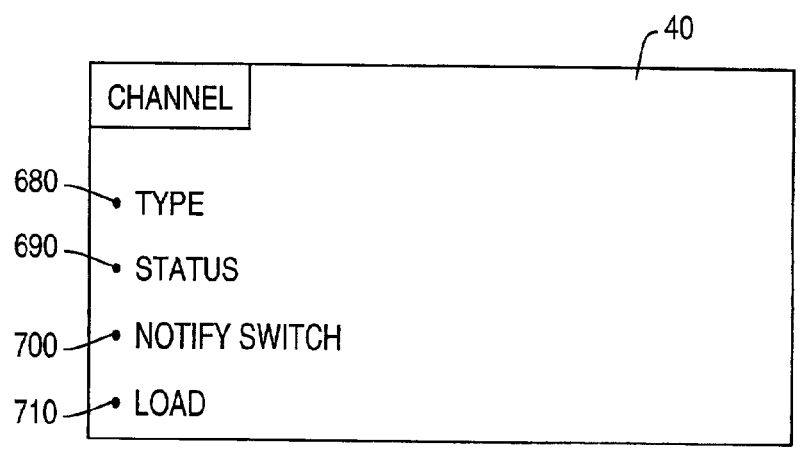
FIG. 11 illustrates the methods associated with a Channel Object in accordance with the present invention.

The Channel Object 40 associated with an added Interaction Object 30 can be acquired from the Interaction Object's 30 Channel Object method 450. The Channel Object 40 and its methods are illustrated in FIG. 11. Channel Objects 40 are responsible for maintaining information about its own type such as status, load, and number of interactions. In this way a Channel Object 40 can manage the channel within which a customer is interacting and ensure that proper performance is being achieved. The Channel Object 40 comprises a Type method 680, a Status method 690, a NotifySwitch method 700, and a Load method 710. The Type method 680 indicates what device is associated with a particular Channel Object 40, devices may include such things as fax, Internet, cellular, kiosk, walk-ups, etc. Each Channel Object 40 may be queried to determine its status and load through the Status 690 and Load 710 methods. The status of a Channel Object 40 comprise the states of inactive, active, idle, and dropped. The load of a Channel Object 40 is maintained by channel type and indicates the current usage percentage of the available channels of a particular type. For example, a Channel Object 40 of type Internet would provide a Load method 710 which when called would return a percentage. The percentage would indicate the usage of the Internet channel type. As one skilled in the art would readily appreciate, this would provide for easy load balancing between channels existing within the Channel Director Object 10. Finally, the NotifySwitch method 700 permits the Channel Object 40 to raise a signal to the Contact Manager Object 20 that a particular channel needs to be changed. In this way the Contact Manager Object 20 may switch Interaction Objects 30 accordingly with minimal interruption to the external customer 75 who is communicating over a particular channel.

Figure 12:
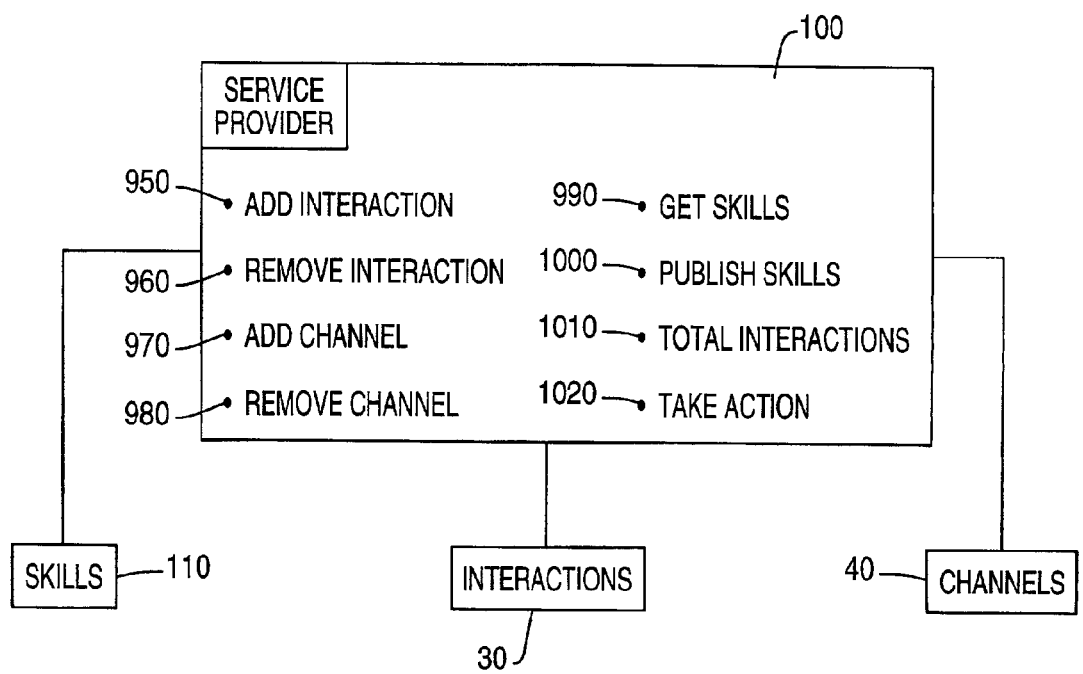
FIG. 12 illustrates a hierarchical view and methods associated with a Service Provider Object in accordance with the present invention.

The Service Provider Object 100 is illustrated in FIG. 12. As previously indicated, a Service Provider Object is an electronic representation of a business service provider. It is through this object that a business will interact with a customer via the Interaction Object 30. A Service Provider Object 100 may be an electronic representation of a human entity or an electronic service provider such as an automated email service provider. A single Service Provider Object 100 may be interacting with multiple Customer Objects 70 at one time.

The Service Provider Object 100 comprises Skills Objects 100, Interaction Objects 30, and Channel Objects 40. The Service Provider Object 100 further comprises an AddInteraction method 950, a RemoveInteraction Object 960, an AddChannel method 970, a RemoveChannel method 980, a GetSkills method 990, a PublishSkills method 1000, a TotalInteractions method 1010, and a TakeAction method 1020.

The Skills Object 110 is another basic object which has access and interfaces to the business enterprise's service provider database. It will include attributes associated with each business Service Provider Object 100 such as authorized channels, conversant subjects, technical abilities, etc.

Figure 13:
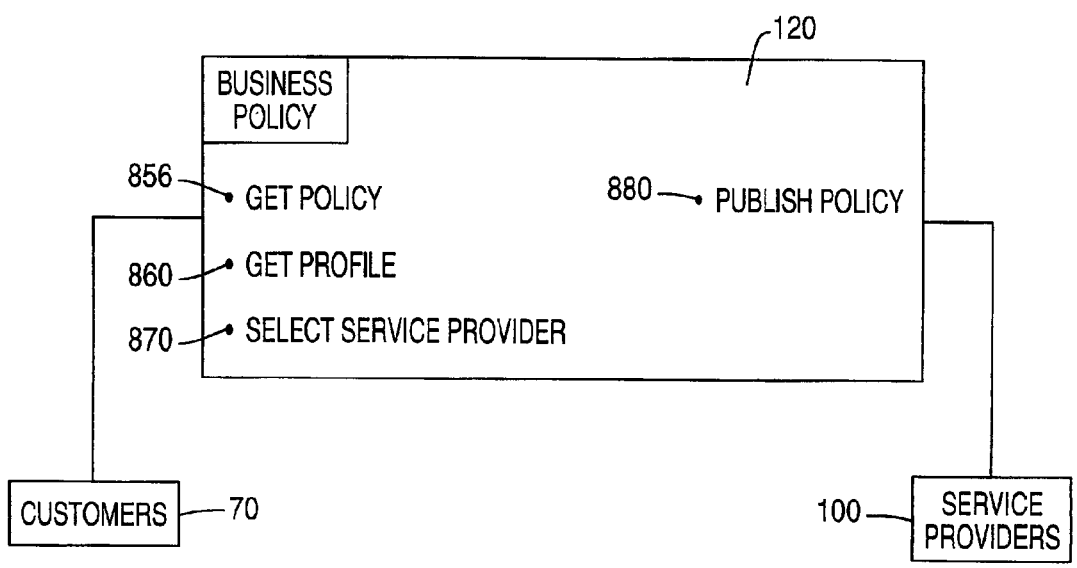
FIG. 13 illustrates a hierarchical view and methods associated with a Business Policy Object in accordance with the present invention.

FIG. 13, illustrates a Business Policy Object 120. The Business Policy Object 120 consists of Customer Objects 70 and Service Provider Objects 100. The Business Policy Object 120 stores and retrieves business policy, customer profiles, and may select a particular Service Provider Object 100 which should be used given a customer profile, and skill set of a Service Provider Object 100. The Business Policy Object comprises a GetPolicy method 850, a GetProfile method 860, a SelectServiceProvider method 870, and a PublishPolicy method 880. The GetPolicy method 850 and the GetProfile method 860 return a business policy and a customer profile, respectively. The particular format of business policies, customer profiles, and the skill sets of service providers would be readily apparent to those skilled in the art and will vary based upon the needs of a particular business. In the preferred embodiment, this information is all contained in a fielded string, the contents of the fielded string being numeric numerals. These numerals are then looked up in a flat table to identify readable text which may be displayed when appropriate to the user. For example, a business policy of no more than 25 interactions per Internet channel and a requirement that each Internet Service Provider Object 100 respond to a request within 2 minutes will be encoded in a business policy fielded string as "0120," where an external table indicates that "01" is the policy for the interaction limits on the Internet channel, and "20" indicates that Internet Service Provider Object 100 must respond within 2 minutes of a customer request. Similarly, the skill sets of a service provider, customer profile, customer privacy, Trap Action Objects 50, and actions are preferably represented as described above. The SelectServiceProvider method 870 will use the skill sets of the Service Provider Object 100, the business policy, and the customer profile to select an appropriate Service Provider Object 100 when requested to do so. This method returns a Service Provider Object 100. Finally, the PublishPolicy method 880 permits policies to be updated and stored as needed.

Figure 14:
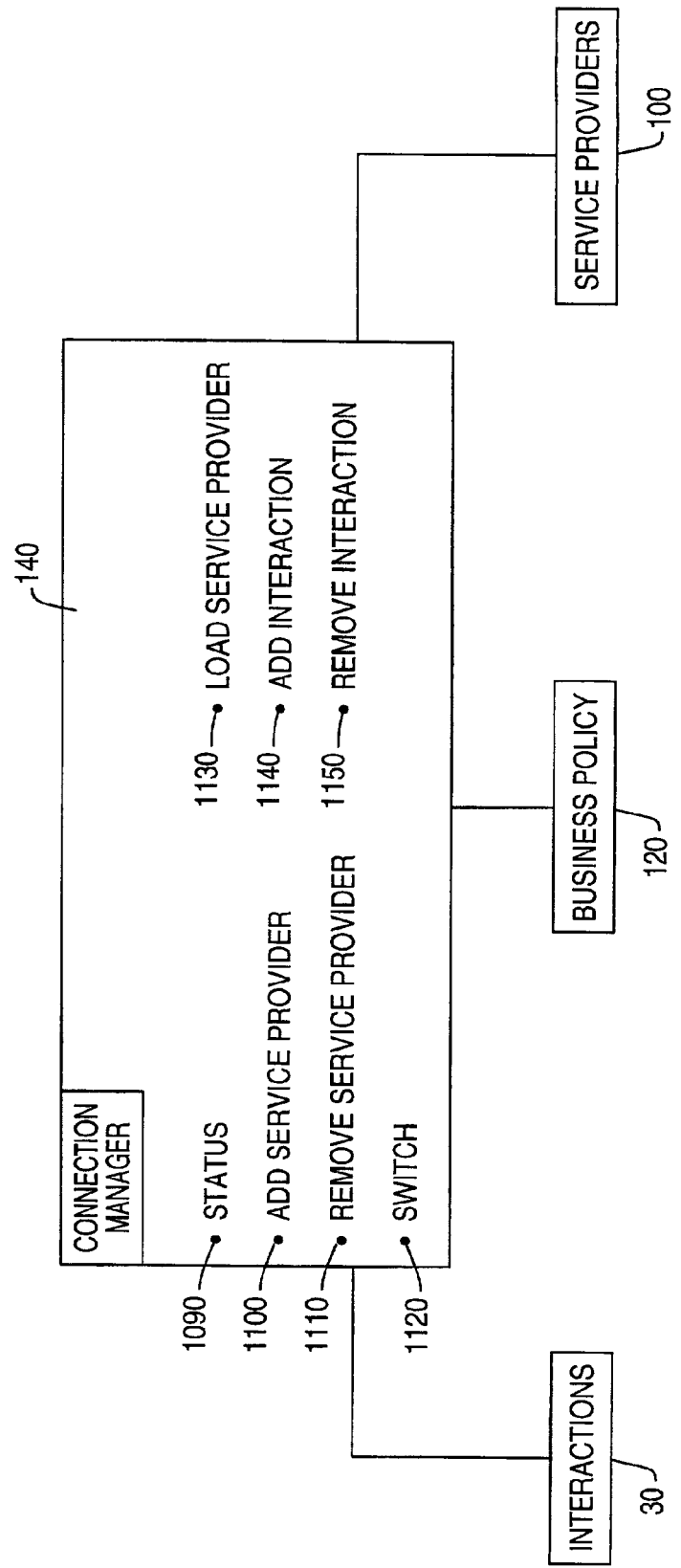
FIG. 14 illustrates a hierarchical view and methods associated with a Connection Manager Object in accordance with the present invention.

A final Connection Manager Object 140 is provided in FIG. 14. The Connection Manager Object 140 is responsible for initially binding an Interaction Object 30 to a specific Service Provider Object 100. It will use the Business Policy Object 120 in its selection process. Furthermore, the Connection Manager Object 140 will monitor all Service Provider Objects 100 within the Channel Director 10 to ensure proper load balancing and performance of Service Provider Objects 100. The Connection Manager Object 140 binds to Interaction Objects 30, the Business Policy Object 120, and the Service Provider Objects 100.

The methods of the Connection Manager Object 140 include a Status method 1040, an AddServiceProvider method 1100, a RemoveServiceProvider method 1110, a Switch method 1120, a LoadServiceProvider method 1130, and AddInteraction method 1140, and a RemoveInteraction method 1150. The AddServiceProvider 1100, RemoveServiceProvider 1110, AddInteraction 1140, and RemoveInteraction 1150 methods permit the Connection Manager Object 140 to manage Service Provider Objects 100 and Interaction Objects 30 by adding and deleting them from internally kept queues. The LoadServiceProvider method 1130 issues a query to a specific Service Provider Object 100 to determine current capacity such as number of existing interactions with Customer Objects 70. The load of a Service Provider Object 100 may dictate that a switch needs to occur to a different less burdened Service Provider Object 100. This is provided for with a Switch method 1120. Finally, a Status method 1090 keeps track of the state of the Connection Manager Object 140 which may be needed on occasion by the Channel Director Object 10 or in the event of failures. This Status method 1090 contains values similar to those discussed above with the Interaction Object 30.

The foregoing description of preferred embodiments of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. A method for managing the cross-channel interactions of a customer, comprising:

identifying a first interaction on a first channel and a second interaction on a second channel, wherein the first and second channels are different channels;

identifying a customer associated with the interactions, wherein the interactions are occurring concurrently;

recording a dialogue corresponding to the first and second interactions;

using the dialogue to modify at least one of the interactions;

identifying a first subject matter associated with the first interaction and a second subject matter associated with the second interaction;

connecting a first service provider to the first interaction based upon the first subject matter and the first channel;

connecting a second service provider to the second interaction based upon the second subject matter and the second channel;

enforcing a plurality of business policies for each of the channels and each of the interactions;

enforcing a plurality of customer profiles for each of the channels and each of the interactions; and alerting the first service provider to take a plurality of actions with the customer based upon the first interaction, the first channel, the first subject matter, the business policies, and the customer profiles.

2. An apparatus for managing cross-channel interactions between a customer and a business apparatus comprising:

a plurality of devices interfaced to the customer;

means for identifying a first interaction on a first channel of one of the devices and a second interaction on a second channel of another of the devices, wherein the first and second channels are different channels;

means for recording a dialogue corresponding to the first interaction and the second interaction;

means for associating the customer with the first and second interactions, wherein the interactions are occurring concurrently;

means for using the dialogue to modify at least one of the interactions;

means for storing a customer profile associated with each of the interactions;

means for retrieving the customer profile associated with each of the interactions;

means for enforcing a plurality of business policies for each of the channels and each of the interactions;

means for enforcing the customer profiles for each of the channels and each of the interactions;

means for identifying a first subject matter associated with the first interaction and a second subject matter associated with the second interaction;

means for connecting a first service provider to the first interaction based upon the first subject matter and the first channel;

means for connecting a second service provider to the second interaction based upon the second subject matter and the second channel; and means for alerting the service providers to take a plurality of actions with the customer based upon the interactions, the channels, the subject matters, the business policies and the customer profiles.

3. A method for managing the cross-channel interactions of a customer while the interactions are occurring comprising:

concurrently establishing a session including a first interaction on a first channel and a second interaction on a second channel, wherein the first and second channels are different channels;

identifying a customer associated with the interactions;

recording a dialogue associated with the first interaction and the second interaction during the session;

modifying at least one of the interactions using the dialogue before the session terminates;

storing a customer profile during the session;

retrieving the customer profile during the session;

enforcing a plurality of business policies for each of the channels and for each of the interactions during the session;

enforcing the customer profiles for each of the channels and for each of the interactions during the session;

identifying one of a plurality of subject matters associated with each of the interactions during the session;

connecting one of a plurality of service providers for each interaction based upon the subject matter associated with the interaction and the channel associated with the interaction during the session;

alerting one of a number of the service providers to take a plurality of actions with the customer based upon the interactions, the channels, the subject matters, the business policies and the customer profiles during the session.

4. A method for connecting a customer interaction to a service provider based upon the interaction and the subject matter of the interaction comprising:

concurrently establishing a first interaction on a first channel and a second interaction on a second channel with a customer, wherein the first and second channels are different channels;

identifying a first subject matter associated with the first interaction and a second subject matter associated with the second interaction;

selecting a first service provider for the first interaction based upon the first subject matter and the first channel;

selecting a second service provider for the second interaction based upon the second subject matter and the second channel;

connecting the first service provider to the customer through the first interaction;

connecting the second service provider to the customer through the second interaction;

enforcing a plurality of business policies for each of the channels and each of the interactions;

enforcing a plurality of customer profiles for each of the channels and each of the interactions;

alerting the first service provider to take a plurality of actions with the customer based upon the first interaction, the first channel, the first subject matter, the privacy policies, the business policies, and the customer profiles; and alerting the second service provider to take a plurality of actions with the customer based upon the second interaction, the second channel, the second subject matter, the business policies, and the customer profiles.

* * * * *